United States Patent
Qiao

(10) Patent No.: US 9,720,542 B2
(45) Date of Patent: Aug. 1, 2017

(54) ACTIVE STYLUS DIFFERENTIAL SYNCHRONIZATION

(71) Applicant: Microsoft Technology Licensing, LLC, Redmond, WA (US)

(72) Inventor: Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 70 days.

(21) Appl. No.: 14/817,937

(22) Filed: Aug. 4, 2015

(65) Prior Publication Data

US 2017/0038884 A1 Feb. 9, 2017

(51) Int. Cl.
*G06F 3/041* (2006.01)
*G06F 3/0354* (2013.01)
*G06F 3/044* (2006.01)

(52) U.S. Cl.
CPC ........ *G06F 3/0416* (2013.01); *G06F 3/03545* (2013.01); *G06F 3/044* (2013.01); *G06F 3/0412* (2013.01)

(58) Field of Classification Search
CPC .. G06F 3/0416; G06F 3/03545; G06F 3/0412; G06F 3/044
See application file for complete search history.

(56) References Cited

U.S. PATENT DOCUMENTS

| | | |
|---|---|---|
| 3,818,133 A | 6/1974 | Cotter |
| 8,279,180 B2 | 10/2012 | Hotelling et al. |
| 8,619,047 B2 | 12/2013 | Westhues |
| 8,780,065 B2 | 7/2014 | Ribeiro et al. |
| 8,786,564 B2 | 7/2014 | Mo et al. |
| 2008/0158165 A1 | 7/2008 | Geaghan et al. |
| 2010/0053113 A1 | 3/2010 | Wu et al. |

(Continued)

FOREIGN PATENT DOCUMENTS

| | | |
|---|---|---|
| CN | 101354618 A | 1/2009 |
| CN | 103534670 A | 1/2014 |
| WO | 2015055024 A1 | 4/2015 |

OTHER PUBLICATIONS

"Atmel Ships Second Generation maXStylus Active Pen Delivering Superior 'Pen-to-Paper' Writing Experience", Published on: Jan. 7, 2014 Available at: http://ir.atmel.com/releasedetail.cfm?ReleaseID=817462.

(Continued)

*Primary Examiner* — Charles Hicks
(74) *Attorney, Agent, or Firm* — Alleman Hall Creasman & Tuttle LLP

(57) ABSTRACT

A touch-sensing system is disclosed. The system includes a display device having a touch sensor with a matrix of row electrodes and column electrodes. Drive logic drives the row electrodes in a plurality of stylus sync sub-frames. In each, some row electrodes, referred to for that stylus sync sub-frame as sync-driven row electrodes, are driven by the drive logic with synchronization waveforms to synchronize the display device with an active stylus. For each stylus sync sub-frame, the sync-driven row electrodes are differentially driven by the drive logic, in the sense that a synchronization waveform used to drive one of the sync-driven row electrodes is different than a synchronization waveform used to drive another of the sync-driven row electrodes.

20 Claims, 5 Drawing Sheets

(56) References Cited

U.S. PATENT DOCUMENTS

| | | |
|---|---|---|
| 2010/0085325 A1 | 4/2010 | King-Smith et al. |
| 2010/0155153 A1 | 6/2010 | Zachut |
| 2012/0013555 A1 | 1/2012 | Maeda et al. |
| 2012/0050207 A1 | 3/2012 | Westhues et al. |
| 2013/0335376 A1 | 12/2013 | Lee |
| 2014/0354555 A1 | 12/2014 | Shahparnia et al. |
| 2014/0375575 A1 | 12/2014 | Kwon et al. |
| 2015/0193033 A1 | 7/2015 | Westhues |
| 2016/0092010 A1* | 3/2016 | Agarwal ............... G06F 3/0412 345/173 |

OTHER PUBLICATIONS

U.S. Appl. No. 14/569,544, Qiao, et al., "Active Stylus Synchronization", filed Dec. 12, 2014.
ISA European Patent Office, International Search Report and Written Opinion Issued in Application No. PCT/US2016/039707, Sep. 14, 2016, WIPO, 12 Pages.

* cited by examiner

ACTIVE STYLUS DIFFERENTIAL SYNCHRONIZATION

BACKGROUND

Some touch sensors are configured to detect touch input by sensing changes in capacitance between row electrodes and column electrodes of an electrode matrix. Touch inputs may be from a user's body (e.g., a finger) and, in some cases, an active stylus. In active-stylus implementations, the stylus may be synchronized with the touch sensor in order to achieve a shared sense of time between the stylus and touch sensor. This may, among other things, facilitate determinations of stylus position relative to the touch sensor.

Multiple rows of the matrix may be driven simultaneously with a synchronization waveform. Via capacitive coupling, this causes current to flow into a tip electrode of the stylus. The current pattern is processed in receive logic of the stylus to achieve synchronization. Current flowing into the stylus tip may be affected by various capacitances and other conditions.

DETAILED DESCRIPTION

Figure 1:
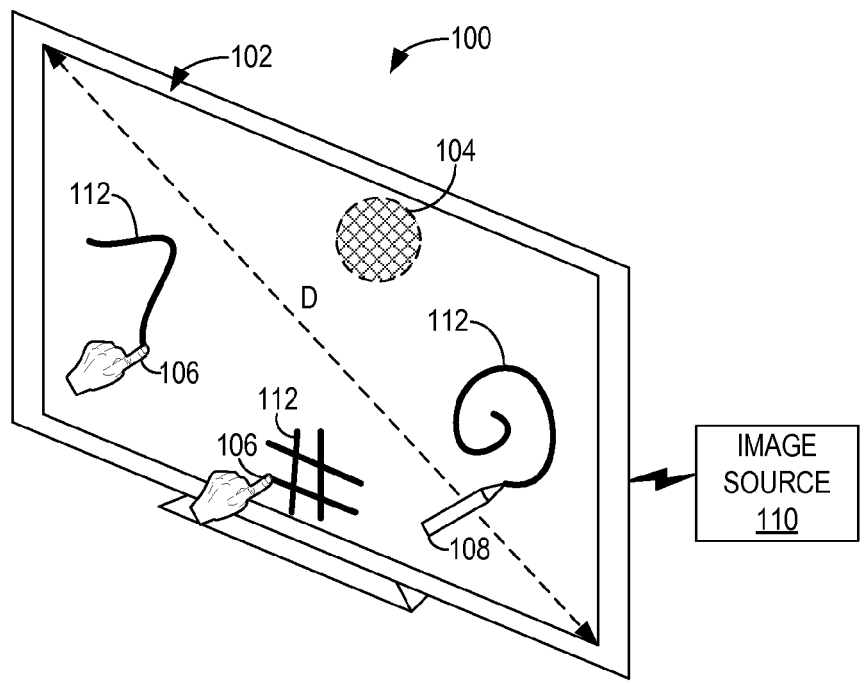
FIG. 1 shows an example display device including a touch sensor receiving touch inputs from a user's body and an active stylus.

Some touch sensors are configured to detect touch input by sensing changes in capacitance between row electrodes and column electrodes of an electrode matrix. In the examples herein, touch inputs may be detected from contact and/or hover of a user's body (e.g., a finger) and an active stylus over the electrode matrix. The stylus may be synchronized with the touch sensor in order to achieve a shared sense of time between the stylus and touch sensor (and/or a display device incorporating the touch sensor). Among other things, the shared sense of time facilitates determinations of relative stylus position.

Synchronization typically is performed every touch-sensing frame during a sub-frame referred to as a stylus sync sub-frame. During a stylus sync sub-frame, row electrodes are driven with synchronization waveforms. For a given stylus sync sub-frame, the activated row electrodes are referred to as sync-driven row electrodes. Via capacitive coupling of sync-driven row electrodes with a tip electrode in the active stylus, synchronization signals are received into receive logic of the stylus, in the form of current patterns flowing into the stylus tip (e.g., time varying current waveform). The inbound current pattern is processed in the receive logic to perform synchronization. In the examples herein, rows spanning the matrix (e.g., every third row) are activated as sync-driven row electrodes, allowing the stylus to achieve synchronization regardless of its row coordinate.

Current flowing into the stylus tip may be affected by various capacitances and other conditions. One challenge in particular may occur when the user's body comes into contact with the matrix. Even when such contact is relatively small (e.g., a fingertip as opposed to a resting palm), the contact patch will typically result in a relatively large increase in capacitance between the user's body and activated sync-driven row electrodes. For example, as compared to the relatively small stylus tip, the user's body may overlap a greater number of sync-driven row electrodes, and over a greater length of the overlapped electrodes. Accordingly, the increase in body-to-matrix capacitance resulting from body contact may be significantly larger than the increase in stylus-to-matrix capacitance resulting from stylus tip contact. This may produce a change at various voltage nodes so as to cause a current flow into the user's body of sufficient magnitude to undesirably degrade current flow into the stylus tip, thereby reducing synchronization performance.

Accordingly, the disclosure contemplates differential driving of sync-driven row electrodes within stylus sync sub-frames. Specifically, different synchronization waveforms may be used for different sync-driven row electrodes. One sync-driven row electrode might be driven with one waveform, while another, different synchronization waveform is used for another sync-driven row electrode. In some cases, two waveforms may be used (e.g., two waveforms of inverse polarity) to drive sync-driven row electrodes. In other cases, three or more different waveforms may be used. In some examples, two-value pulse trains are employed (e.g., binary waveforms). In other cases, employed waveforms may include digital waveforms taking on a greater range of values, analog waveforms, or any other type of waveforms.

Differential waveforms may be employed to provide cancellation to reduce current into a user's body. For example, within a given spatial grouping of sync-driven row electrodes, differential waveforms may be employed so as to produce at least partially cancelling electrical conditions. Therefore, for a user body contact patch over that spatial grouping, current flowing into the user's body is reduced relative to what would occur with undifferentiated driving (using the same waveform on all of the sync-driven row electrodes in the grouping).

In some examples, different sets of sync-driven row electrodes may be employed for different stylus sync sub-frames, with different synchronization waveforms being used in each set. In other words, one set of sync-driven row electrodes might be employed for one sub-frame, with a second, different set of sync-driven row electrodes employed for the next sub-frame. Any number of sets may be employed. Typically, the sets differ in that one or more row electrodes function as sync-driven row electrodes in one set, but not in another set. For example, rows 1, 4 and 7 might be activated in a first sync sub-frame. In a second sub-frame, those might be inactive, while rows 2, 5 and 8 are activated. Reasons for omitting some row electrodes from being activated during a sync sub-frame will be explained in detail below. For a given stylus contact point, shifting synchronization waveforms via use of different sets from frame-to-frame changes the distance between those waveforms and the stylus contact point, which affects the signals received into the stylus. One of the sets may be preferred for a given contact point, in that it brings a useful waveform close to the stylus, while having potentially canceling waveforms further away from the stylus. In such a setting, position information of the stylus may be used to select a particular set for an upcoming sync sub-frame (i.e., selecting a set which results in a desired waveform being positioned as close as possible to the current stylus location)

FIG. 1 shows a touch interactive display system 100 including a display device 102 that has a touch sensor 104. In some examples, display device 102 may be a large format display with a diagonal dimension D greater than 1 meter, though the display may assume any suitable size. Display device 102 may be configured to sense one or more sources of input, such as touch input imparted via a digit 106 of a user and/or input supplied by an input device 108, shown in FIG. 1 as a stylus. Digit 106 and input device 108 are provided as non-limiting examples and any other suitable source of input may be used in connection with display device 102. Display device 102 may be configured to receive input from styluses and digits in contact with the display and/or "hovering" over the display surface. "Touch input" as used herein refers to both digit and non-digit (e.g., stylus) input. In some examples, display device 102 may be configured to receive input from two or more sources simultaneously, in which case the display may be referred to as a multi-touch display.

Display device 102 may be operatively coupled to an image source 110, which may be, for example, a computing device external to, or housed within, the display. Image source 110 may receive input from display device 102, process the input, and in response generate appropriate graphical output 112 for the display. In this way, display device 102 may provide a natural paradigm for interacting with a computing device that can respond appropriately to touch input. Details regarding an example computing device are described below with reference to FIG. 7.

Figure 2:
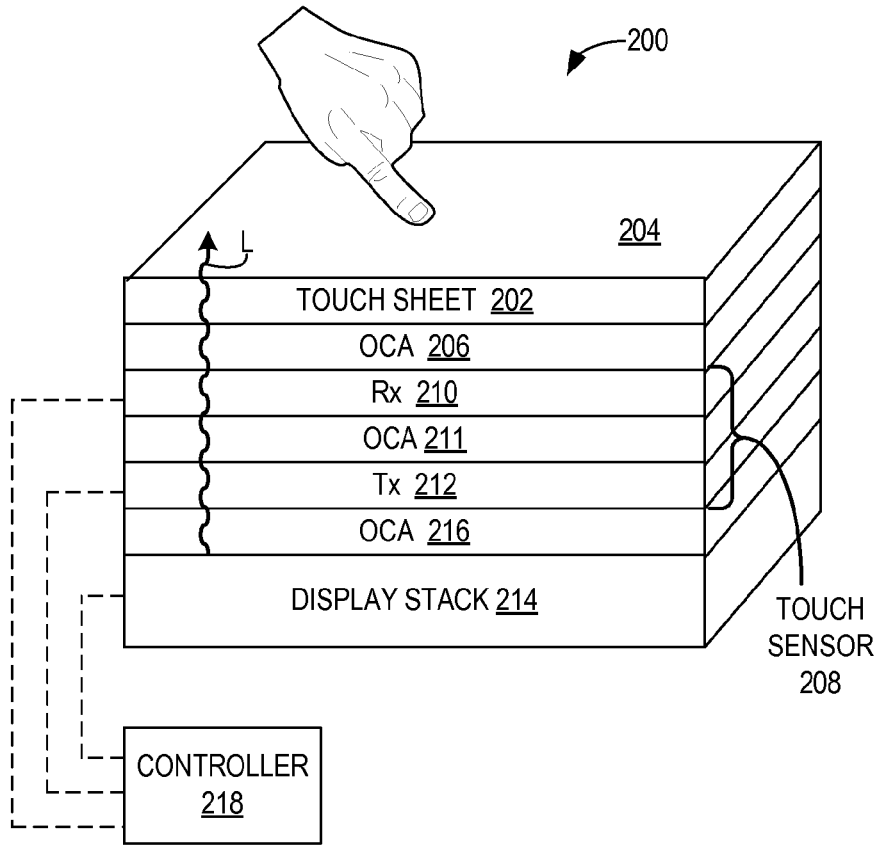
FIG. 2 shows a cross-sectional view of an optical stack of the display device of FIG. 1.

FIG. 2 is a cross-sectional view of an optical stack 200 of display device 102 (FIG. 1). Optical stack 200 includes a plurality of components configured to enable the reception of touch input and the generation of graphical output. As shown in FIG. 2, optical stack 200 may include an optically clear touch sheet 202 having a top surface 204 for receiving touch input, and an optically clear adhesive (OCA) 206 bonding a bottom surface of the touch sheet to a top surface of a touch sensor 208, which may be touch sensor 104 (FIG. 1), for example. Touch sheet 202 may be comprised of any suitable materials, such as glass or plastic. As used herein, "optically clear adhesive" refers to a class of adhesives that transmit substantially all (e.g., about 99%) of incident visible light.

As described in further detail below with reference to FIG. 3, touch sensor 208 includes a matrix of electrodes that form capacitors whose capacitances may be evaluated in detecting touch input. As shown in FIG. 2, the electrodes may be formed in two separate layers: a receive electrode layer (Rx) 210 and a transmit electrode layer (Tx) 212 positioned below the receive electrode layer. Receive and transmit electrode layers 210 and 212 may each be formed on a respective dielectric substrate comprising materials including but not limited to glass, polyethylene terephthalate (PET), or cyclic olefin polymer (COP) film. Receive and transmit electrode layers 210 and 212 may be bonded together by a second optically clear adhesive 211. OCA 211 may be an acrylic pressure-sensitive adhesive film, for example. The touch sensor configuration illustrated in FIG. 2 is provided as an example; alternative arrangements are within the scope of this disclosure. In other implementations, for example, layers 210, 211, and 212 may be integrally formed as a single layer with electrodes disposed on opposite surfaces of the integral layer. Further, touch sensor 208 may alternatively be configured such that transmit electrode layer 212 is provided above, and bonded to via OCA 211, with receive electrode layer 210 being positioned therebelow.

Receive and transmit electrode layers 210 and 212 may be formed by a variety of suitable processes. Such processes may include deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternatively facing toward the user with a protective sheet (e.g., comprised of PET) between the user and metal. Although transparent conducting oxide (TCO) is typically not used in the electrodes, partial use of TCO to form a portion of the electrodes with other portions being formed of metal is possible. In one example, the electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold), metallic alloys, conductive allotropes of carbon (e.g., graphite, fullerenes, amorphous carbon), conductive polymers, and conductive inks (e.g., made conductive via the addition of metal or carbon particles).

Continuing with FIG. 2, touch sensor 208 may be bonded, at a bottom surface of transmit electrode layer 212, to a display stack 214 via a third optically clear adhesive 216. Display stack 214 may be a liquid crystal display (LCD) stack, organic light-emitting diode (OLED) stack, or plasma display panel (PDP), for example. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as an image displayed on top surface 204 of touch sheet 202.

Further variations to optical stack 200 are possible. For example, implementations are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 2 also shows a controller 218 operatively coupled to receive electrode layer 210, transmit electrode layer 212, and display stack 214. Controller 218 is configured to drive transmit electrodes in transmit electrode layer 212, receive signals resulting from driven transmit electrodes via receive electrodes in receive electrode layer 210, and locate, if detected, touch input imparted to optical stack 200. Controller 218 may further drive display stack 214 to enable graphical output responsive to touch input. Two or more controllers may alternatively be provided, and in some examples, respective controllers for each of receive electrode layer 210, transmit electrode layer 212, and display stack 214. In some implementations, controller 218 may be implemented in image source 110 (FIG. 1).

Figure 3:
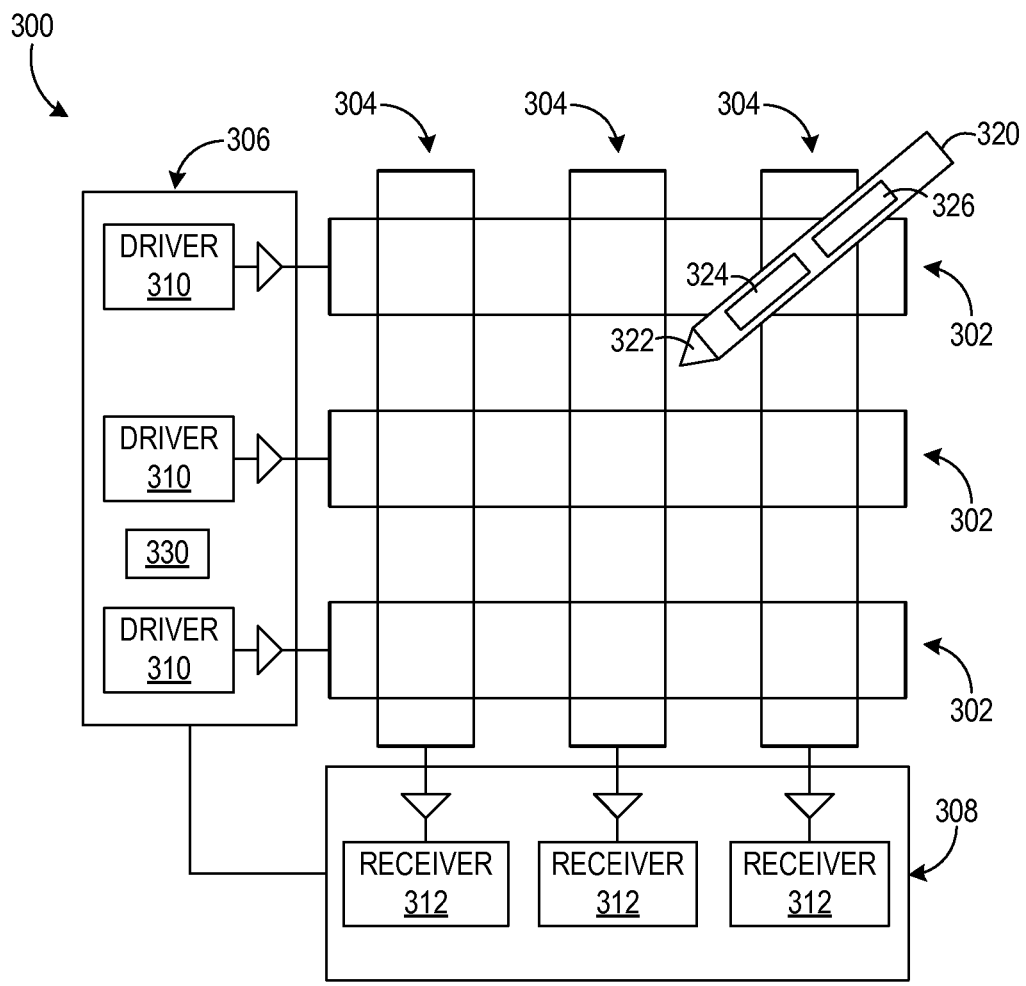
FIG. 3 shows an example touch sensor matrix and active stylus.

FIG. 3 shows an example touch sensor matrix 300. Matrix 300 may be included in touch sensor 208 of optical stack 200 (FIG. 2) to bestow touch sensing functionality to display device 102 (FIG. 1), for example. Matrix 300 includes a plurality of row electrodes and column electrodes. In the present example, the electrodes are shown in the form of row electrodes 302 vertically separated from column electrodes 304. As described below, the row electrodes may be transmitters/drivers, with voltage waveforms (also referred to as "excitation waveforms") being used to stimulate them via operation of drive logic. This in turn affects electrical conditions on the column electrodes (e.g., the excitation waveform produces a time-varying current on the column electrode), and the column electrodes operate in a receive mode with accompanying circuitry to process the induced electrical conditions. Referring again to FIG. 2, row electrodes 302 and column electrodes 304 may be respectively formed in transmit electrode layer 212 and receive electrode layer 210 of optical stack 200, for example. Each intersection of row electrodes 302 with column electrodes 304 forms a corresponding node whose electrical properties (e.g., capacitance) may be measured to detect touch input. Three row electrodes 302 and three column electrodes 304 are shown in FIG. 3 for the purpose of clarity, though matrix 300 may include any suitable number of row electrodes and column electrodes, which may be on the order of one hundred or one thousand, for example. Any suitable number of electrodes may be employed, depending on the setting.

While a rectangular grid arrangement is shown in FIG. 3, matrix 300 may assume other geometric arrangements—for example, the matrix may be arranged in a diamond pattern. Alternatively or additionally, individual electrodes in matrix 300 may assume nonlinear geometries—e.g., electrodes may exhibit curved or zigzag geometries, which may minimize the perceptibility of display artifacts (e.g., aliasing, moiré patterns) caused by occlusion of an underlying display by the electrodes. In addition, "row" and "column," as used herein, does not imply any particular orientation relative to the display or to the floor/ground. In other words, relative to the display device or floor/ground, rows may be horizontal, vertical or in any other orientation. Typically, however, all of the rows will be parallel to one another, as will all of the columns.

The depicted system may also include drive logic 306 coupled to the row electrodes 302 and receive logic 308 coupled to the column electrodes 304. Drive logic 306 and receive logic 308 may perform a variety of functions, and may, as in the present example, be interconnected in order to coordinate activity, exchange data, etc. In general, drive logic 306 is involved in causing excitation waveforms to be applied to row electrodes 302, while receive logic 308 is involved in processing and interpreting signals on column electrodes 304.

Each row electrode 302 in matrix 300 may be coupled to a respective driver 310 (included in drive logic 306) configured to drive its corresponding row electrode with an excitation waveform (e.g., a time-varying voltage). In some implementations, drivers 310 of matrix 300 may be driven by a micro-coded state machine implemented within a field-programmable gate array (FPGA) forming part of controller 218 (FIG. 2), for example. Each driver 310 may be implemented as a shift register having one flip-flop and output for its corresponding row electrode, and may be operable to force all output values to zero, independently of register state. The inputs to each shift register may be a clock, data input, and a blanking input, which may be driven by outputs from the micro-coded state machine. Signals may be transmitted by filling the shift register with ones on every output to be excited, and zeroes elsewhere, and then toggling the blanking input with a desired modulation to create a transmitted waveform for exciting a row electrode. The excitation waveforms may be time-varying voltages that, when digitally sampled, comprise a sequence of pulses—e.g., one or more samples of a relatively higher (or lower) digital value followed by one or more samples of a relatively lower (or higher) digital value. If a shift register is used in this fashion, waveforms may take on only two digital values—e.g., only binary waveforms can be transmitted. In other implementations, drivers 310 may be configured to transmit non-binary waveforms that can assume three or more digital values. Non-binary excitation waveforms may enable a reduction in the harmonic content of driver output and decrease the emissions radiated by matrix 300. In still other examples, non-quantized waveforms may play a role in row electrode excitation. Any practicable method may be employed by drive logic 306 to generate appropriate excitation waveforms on the row electrodes 302.

In some implementations, matrix 300 may be configured to communicate and interact with an active stylus 320 (e.g., corresponding to input device 108 of FIG. 1), which may include a tip electrode 322 (also referred to as the stylus electrode or stylus tip); drive logic 324 responsible for applying waveforms to tip electrode 322 for transmission to matrix 300; and receive logic 326 responsible for processing waveforms received from matrix 300 (e.g., as a result of drive logic 306 exciting a row electrode 302 in close proximity to the stylus tip). In the context of FIG. 1, use of a stylus such as active stylus 320 may at least partially enable touch sensitive display device 102 to communicate with input device 108 when matrix 300 is implemented in display device 102. Specifically, an electrostatic link may be established between tip electrode 322 and one or more row electrodes 302 or one or more column electrodes 304, along which data may be transmitted.

In one example, electrostatic communication is conducted via transmission of a synchronization waveform from matrix 300 to the active stylus 320. The synchronization waveform may enable matrix 300 and stylus 322 to obtain a shared sense of time. In some examples, synchronization waveforms may be transmitted via multiple row electrodes 302 simultaneously so that the active stylus can receive the synchronization waveform regardless of the active stylus's position relative to the matrix. In the case that waveforms are transmitted by multiple row electrodes 302 simultaneously, different waveforms may be used on different row electrodes 302, as explained in detail below. In some cases, synchronization may be performed via correlation operations, in which received waveforms are processed using reference waveforms that are based on the synchronization waveforms.

The shared sense of time may facilitate the correlation of a time at which the stylus detects a signal transmitted on row electrodes 302 to a location on matrix 300. Such correlation may enable the stylus to determine at least one coordinate (e.g., its row coordinate) relative to matrix 300, which may be transmitted back to the matrix (e.g., via the electrostatic link) or to an associated display via a different communication protocol (e.g., radio, Bluetooth). To determine a second coordinate (e.g., a column coordinate) of the stylus, all row electrodes 302 may be held at a constant voltage, and the stylus may transmit a time-varying voltage to matrix 300, which may measure currents resulting from the stylus voltage in each column electrode 304 to ascertain the second coordinate.

Each column electrode 304 in matrix 300 may be coupled to a respective receiver 312 configured to analyze received signals resulting from the transmission of waveforms on row electrodes 302. During touch detection, matrix 300 may hold all row electrodes 302 at a constant voltage except for an active row electrode 302 along which an excitation waveform is transmitted. During transmission of the excitation sequence, all column electrodes 304 may be held at a constant voltage (e.g., ground). With the excitation waveform applied to the active row electrode 302 and all column electrodes 304 held at the constant voltage, a current may flow into each of the receivers 312 as a result of application of the excitation waveform. This current is proportional to the capacitance. Touch detection is achieved as a result of the change in capacitance produced, for example, by the presence of a user's finger. Matrix 300 may be repeatedly scanned at a frame rate (e.g., 60 Hz, 120 Hz) to persistently detect touch input, where a complete scan of a frame comprises applying an excitation sequence to each transmit row 302, and for each driven transmit row, collecting output from all of the receive columns 304. However, in other examples, a complete scan of a frame may be a scan of a desired subset, and not all, of one or both of transmit row electrodes 302 and receive column electrodes 304.

Higher resolution positional determinations of both a user's finger and an active stylus may be achieved via interpolation methods. Using the above example of determining a stylus's row coordinate, measurements for rows on either side of a highest-signal row may be assessed. Assuming the stylus detects a highest signal strength at time t(K), corresponding to the excitation of row K, the system may also take readings from any number or distribution of neighboring row electrodes. In one non-limiting example, measurements are assessed for rows K−2, K−1, K+1 and K+2. The distribution of received signal strength across these rows enables the system to increase the positional resolution. Similarly, when the stylus is transmitting through operation of drive logic 324, one of the column electrodes 304 receives the strongest signal (i.e., the nearest column to the stylus). Signal strength at nearby columns can be used for interpolation. Similar interpolation methods may be used for determining finger/hand position (i.e., measure strength of signals neighboring the highest-signal column or highest-signal row).

Figure 4:
FIG. 4 shows an example touch-sensing frame, including a stylus sync sub-frame during which the active stylus and display device of FIGS. 1 and 3 may communicate electrostatically to synchronize the display device and stylus.

From the above, it will be appreciated that touch functionality (from user's body and stylus) occurs over an ongoing series of touch-sensing frames, during which drive logic in matrix 300 or stylus 320 drive electrodes therein to transmit waveforms to receiving electrodes, where the received signals are processed by receive logic (e.g., receive logic 308 or receive logic 326). FIG. 4 depicts an example touch-sensing frame 400. Each touch-sensing frame 400 includes a number of different sub frames. One sub-frame is a stylus sync sub-frame (SSSF) 402, during which, as described above, row electrodes 302 on matrix 300 transmit synchronization waveforms to enable stylus 320 and display device 102 to gain/maintain a shared sense of time.

During any given stylus sync sub-frame (SSSF) 402, the specific row electrodes 302 being driven with synchronization waveforms are referred to, for that stylus sync sub-frame (SSSF) 402, as sync-driven row electrodes. The specific sync-driven row electrodes being used may vary from one stylus sync sub-frame (SSSF) 402 to the next. In some cases, multiple different sets of sync-driven row electrodes may be employed, each of which omits some row electrodes 302 (e.g., two out of every three). In other words, a given row electrode 302 may be a sync-driven row electrode in one set, but not in another. In some examples, a set of sync-driven row electrodes may use differing synchronization waveforms (i.e., a waveform used on one sync-driven row electrode differs from that used on another in the set). Sync-driven row electrodes and the synchronization waveforms employed with them will be discussed in more detail below.

Two other sub-frames, also discussed above, which may be employed, are (1) a row-drive sub-frame (RDSF) 404 during which row electrodes are driven sequentially to support determination of a row coordinate of stylus 320 and row and column coordinates of user's body 106; and (2) a stylus-drive sub-frame (SDSF) 406 during which stylus 320 is driven to facilitate determination of its column coordinate. Touch-sensing frames typically repeat at relatively high frequencies to support rapidly updated touch detection with minimal lag (e.g., between finger movement and a line being drawn under the user's finger). In one example, a frame rate of 120 Hz may be employed.

During the stylus sync sub-frames (SSSFs) 402, gaining and maintaining proper synchronization may depend upon whether a current having sufficient magnitude is flowing into stylus electrode 322. Current flowing into stylus electrode 322 may depend on various capacitances during the stylus sync sub-frames (SSSFs) 402. The most relevant capacitances may be (1) Cts—capacitance from the stylus electrode 322 to row electrodes 302 being driven with synchronization waveforms; (2) Ctg—capacitance from stylus electrode 322 to a chassis ground of display device 102 or equivalent (e.g., receive column electrodes 304 or inactive row electrodes 302); (3) Cbs—capacitance from the user's body 106 to row electrodes 302 being driven with synchronization waveforms (i.e., sync-driven row electrodes); and (4) Cbg—capacitance from the user's body 106 to a chassis ground of display device 102 or equivalent.

Three conditions will now be described, along with their potential effect upon current flowing into stylus electrode 322 in the case of undifferentiated driving of the sync-driven row electrodes. The first condition may be described as:

$$Cts/(Cts+Ctg) \gg Cbs/(Cbs+Cbg) \quad (1)$$

Under these circumstances (equation 1 above), synchronization waveforms on row electrodes 302 may cause sufficient current to flow into stylus electrode 322 (e.g., of sufficient SNR to derive useful synchronization information from the inbound waveform).

The second condition may be described as:

$$Cts/(Cts+Ctg) \approx Cbs/(Cbs+Cbg) \quad (2)$$

Under these circumstances (equation 2 above), synchronization waveforms on row electrodes 302 may cause negligible current to flow into stylus electrode 322. As a result, stylus 320 is not able to receive a sufficiently strong signal to support synchronization.

The third condition may be described as:

$$Cts/(Cts+Ctg) \ll Cbs/(Cbs+Cbg) \quad (3)$$

Under these circumstances (equation 3 above), synchronization waveforms on row electrodes 302 may cause current to flow out of stylus electrode 322. Such reverse polarity/phase current may also hinder synchronization.

In many cases, capacitance of the user's body to driven rows of matrix 300 (Cbs) will have the strongest effect on which of the above three conditions exist during any given stylus sync sub-frame. Specifically, when the user touches display device 102 over matrix 300, Cbs increases. The increase may be substantial, particularly in the not-infrequent case of a large contact patch (e.g., user rests their palm on the display while holding the stylus). In such a case, the user's body significantly covers sync-driven row electrodes during a series of stylus sync sub-frames (SSSFs) 402. Relative to when the stylus contacts the display, the user's body overlaps more sync-driven row electrodes, and overlaps them along a greater length. As a result of the relatively large increase in Cbs and the associated change at various voltage nodes (e.g., a relative increase in stylus body voltage relative to stylus tip voltage), increased current may flow into the user's body, thereby reducing current into the stylus electrode, in turn hindering the ability of the stylus to obtain a sufficiently strong synchronization signal.

Figure 5:
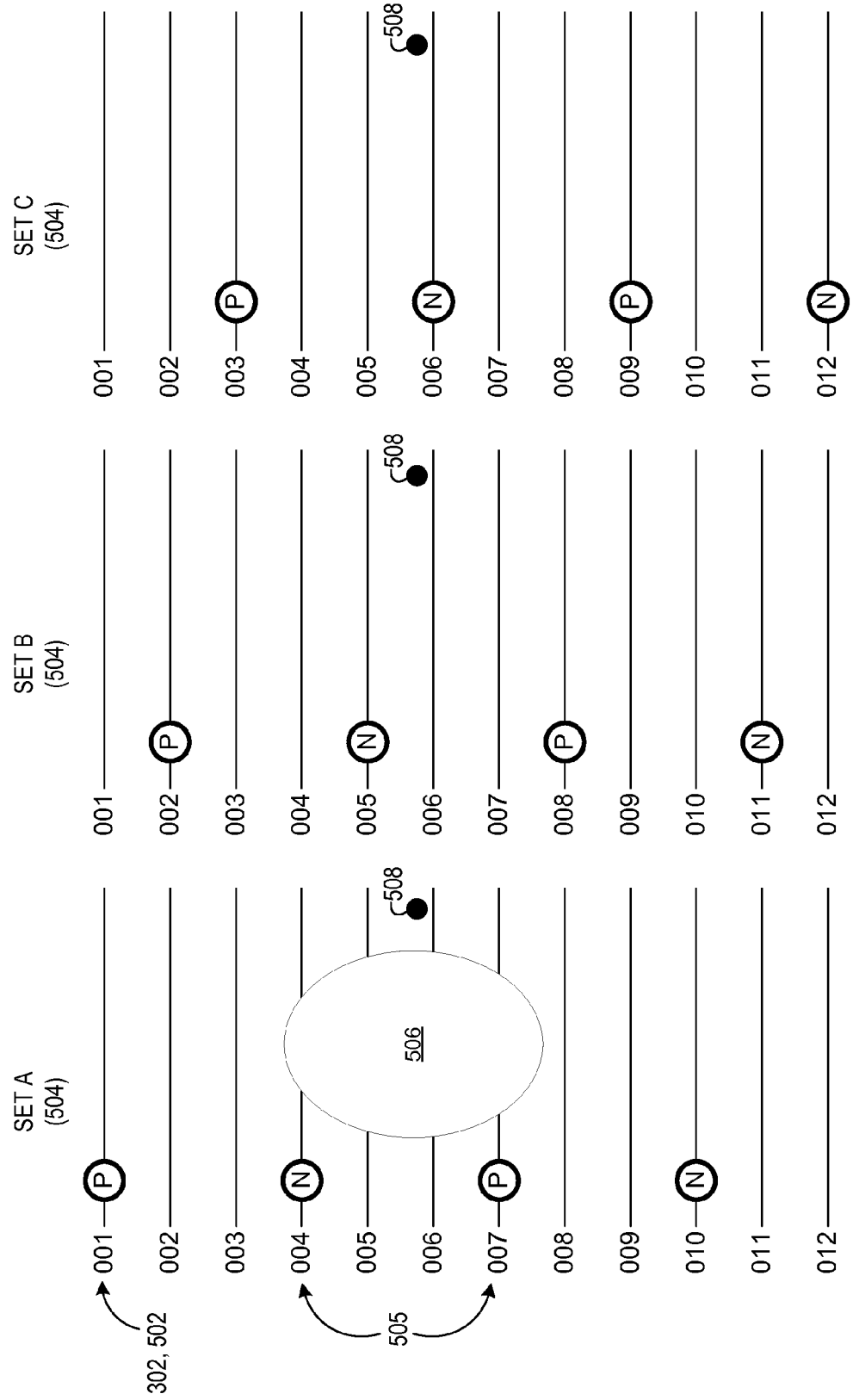
FIG. 5 shows different sets of sync-driven row electrodes that may be differentially driven in different stylus sync sub-frames to facilitate synchronization.

As will now be described, the compromising of stylus current may in some examples be improved by differentially driving sync-driven row electrodes in touch-sensing frames 400. In other words, within a given stylus sync sub-frame (SSSF) 402, drive logic 306 may use one synchronization waveform on some sync-driven row electrodes, and another, different, synchronization waveform on other sync-driven row electrodes. Any number and type of different synchronization waveforms may be used in a given stylus sync sub-frame (SSSF) 402. As described in detail below, the different synchronization waveforms are configured to create at least partially cancelling electrical conditions to reduce current flowing into a user's body that would undesirably affect synchronization current flowing into stylus electrode 322. FIG. 5 shows an example of such differential driving. The figure shows twelve row electrodes 302, as driven during three successive stylus sync sub-frames (SSSFs) 402. In this example, every nth electrode (n=3 here, but could be any other practicable number) is a sync-driven row electrode. One such sync-driven row electrode is indicated at 502 in the figure. Different sets of sync-driven row electrodes may be employed; three sets 504 are depicted. In the first stylus sync sub-frame, the set of sync-driven row electrodes (Set A) includes electrodes 001, 004, 007, 010. In the figure, sync-driven row electrodes 502 are distinguished from inactive row electrodes in that they are labeled with a synchronization waveform that is used on the electrode for synchronization (waveform labels in the figure are an encircled "P" and an encircled "N," to be explained). In Set B, the sync-driven row electrodes are rows 002, 005, 008, 011; in Set C, the sync-driven row electrodes are rows 003, 006, 009, 012. When referring to a "set" of sync-driven row electrodes 302, or "set information," this disclosure is referring to the specific row electrodes that are being driven during sync, and to the specific differential waveforms that are used for sync. In the example of FIG. 5, varied use of the three different sets cause the deployed waveforms to spatially shift in terms of row coordinate from frame to frame. This in turn, will cause the deployed respective waveforms to vary in distance to a given stylus contact point from frame to frame.

As mentioned above, different waveforms may be employed on the sync-driven row electrodes 502 in each set. Specifically, in any given stylus sync sub-frame (SSSF) 402, drive logic 306 (FIG. 2) may be configured to use two or more different waveforms on different sync-driven row electrodes for synchronization. In this example, reverse polarity waveforms are used (positive waveform indicated with an encircled "P" and negative waveform indicated with an encircled "N"). As shown in the figure, Sets A, B and C differ from one another in that the spatial distribution of sync-driven row electrodes, inactive row electrodes (i.e., not driven with synchronization waveforms) and specific synchronization waveforms are the same but shifted by one row electrode 302 from one set to the next. The different waveforms yield at least partially cancelling electrical conditions (e.g., when two inverse waveforms are close to one another) to reduce current flowing into the user's body and thereby avoid adverse impacts upon current flowing into the stylus electrode. In all three sets, a one-by-one alternating polarity scheme is employed, in which every sync-driven row electrode is driven with a synchronization waveform that is inverted with respect to that used on the adjacent sync-driven row electrodes.

Current reduction/cancellation into the user's body may be considered in terms of "spatial groupings" of sync-driven row electrodes. Referring to the first stylus sync sub-frame (Set A), the sync-driven row electrodes 502 may be grouped into various spatial groupings. One such spatial grouping is indicated at 505, and includes two sync-driven row electrodes 502 (rows 004 and 007). Two-row groupings may also be formed from the following sync-driven row electrode pairs in Set A: 001/004 and 007/010. Alternatively, a spatial grouping may include more than two row electrodes 302 (e.g., all four sync-driven row electrodes in Set A). Any practicable number of sync-driven row electrodes may comprise a spatial grouping.

When a user's body contacts display device 102, a contact patch may cover a spatial grouping of sync-driven row electrodes. Such a contact patch is shown at 506, and sits over spatial grouping 505 so as to overlap sync-driven row electrodes at rows 004 and 007. In many cases, the contact patch will cover a larger number of row electrodes 302; four electrodes, two of which are sync-driven row electrodes, are used here for clarity. As indicated above, a contact patch with significant electrode overlap can potentially produce a significant change in capacitance which can reduce current into a stylus tip. The opposite polarity waveforms on electrodes 004 and 007 may produce at least partially cancelling electrical conditions. This can reduce the current into the user's body, in some cases reducing it to zero, thereby avoiding some current reduction into the stylus electrode.

It will be appreciated that these partially cancelling conditions would occur in Sets A, B and C in the event of any contact patch overlapping any number of sync-driven row electrodes 302. Overlap of an even number of electrodes potentially would allow for greater cancellation, though even where an odd number of sync-driven row electrodes are overlapped, sufficient cancellation may be achieved. Typically, and as in the present example, a plurality of spatial groupings exist across the span of the matrix, each one including differentially driven sync-driven row electrodes, such that current into a user's body would be reduced relative to that which would occur if the same waveforms were used. In some examples, current-reducing spatial groupings may be sized based on an expected minimum size of a body contact patch. For example, the grouping may be sized based on a patch size that would provide a particular level of synchronization interference in the event of undifferentiated driving of sync-driven row electrodes It will be appreciated that any number, type and placement of different synchronization waveforms may be used within a spatial grouping/contact patch. The above example contemplates opposite polarity waveforms (e.g., binary pulse train), alternating at every other drive electrode. A different distribution might involve clustering of similar polarities (e.g., clusters of two or more positive waveforms spatially interleaved with clusters of two or more negative waveforms). More than two different waveforms may be employed. Digital waveforms taking on more than two values may be employed. Analog waveforms may be employed. Different frequencies, phases and amplitudes may be employed. In general, any synchronization waveform configuration may be used where the different waveforms under a body contact patch provide some cancellation to reduce into-body current.

In certain settings, synchronization performance may be affected by the spacing between sync-driven row electrodes. For example, a higher density of electrodes providing cancelling waveforms may more effectively provide cancellation for a variety of different size contact patches. A relatively high density would ensure, for example, that a sufficient number of varied waveforms are driven underneath an expected smallest contact patch, i.e., sufficient to achieve a desired level of cancellation. Additionally, a high-density scheme may decrease the number of sets of sync-driven row electrodes, thereby reducing the latency for the stylus gaining the shared sense of time.

Referring to the depiction of FIG. 5, a high-density scheme potentially could entail all twelve row electrodes 302 being sync-driven row electrodes, and altering one-by-one between positive "P" synchronization waveform and negative "N" synchronization waveform (e.g., even rows positive, odd rows negative). In such a case, for any given contact point of stylus electrode 322 on the matrix, the stylus tip would be close enough to both waveforms that they potentially would cancel/reduce current flowing into the stylus, thereby weakening the received synchronization signal.

Accordingly, in some cases it will be desirable to have an increased distance between sync-driven row electrodes, as in the every-nth example of FIG. 5. Therefore, when the stylus is close to a particular sync-driven row electrode, the distance to neighboring sync-driven row electrodes is sufficiently large so as to reduce the capacitance from the stylus tip to those electrodes. The stylus therefore receives a strong synchronization signal, without interference from synchronization waveforms on adjacent sync-driven row electrodes that would potentially reduce the strength of the synchronization signal.

Regardless of whether sync-driven row electrodes are closely or distantly spaced, it may be desirable to employ different sets of sync-driven row electrodes. When employed, the different sets may be configured so that, for any given point on an operative portion of a touch-sensing matrix, using at least one of the sets will cause a reduction in distance, to below a threshold, between such point and a closest sync-driven row electrode, relative to another set of the sync-driven row electrodes. For example, assuming a minimum desired threshold distance between a sync-driven row electrode 502 and where stylus electrode 322 is contacting matrix 300, different sync-driven row electrode sets may be employed so that at least one of them includes a sync-driven row electrode that will be within that threshold distance from the stylus electrode 322, to thereby provide a sufficiently strong signal with minimized interference from other synchronization waveforms. In other words, the different sets of sync-driven row electrodes may be constructed such that cycling through them causes frame-to-frame variation between a stylus contact point and a closest sync-driven row electrode.

Referring to point 508 on the matrix (e.g., a contact point where stylus electrode 322 might contact matrix 300), it will be seen that performance may vary between Sets A, B and C. Cycling through the sets from stylus sync sub-frame to the next causes the distance between point 508 and the closest sync-driven row electrodes to vary. As indicated above, it will normally be desirable that, for at least one of the sets, the stylus tip is relatively close to one sync-driven row electrode and relatively distant from any sync-driven row electrode that would produce cancellation (e.g., close to a one waveform and far from an inversion of that waveform). Referring specifically to FIG. 5, Set C provides the best performance in this regard. In Set A and Set B, the stylus electrode would be (1) either too far from the neighboring sync-driven row electrodes; and/or (2) the proximity to each sync-driven row electrode would be sufficient, but the nearby inverted waveforms would reduce the signal received by the stylus.

More generally, different sets of sync-driven row electrodes, and the differential waveforms used to drive them, may be used to provide, for a stylus electrode contact point on a matrix, varied positioning of the following relative to that contact point: (1) a synchronization waveform or waveforms that cause receipt of a synchronization signal into the stylus; and (2) a synchronization waveform or waveforms that counter the effect of (1). As indicated above, using different sets increases the potential that the distance of (1) will be relatively small while the distance of (2) will be relatively large.

Referring to the example of FIG. 5, drive logic 306 may selectively apply the different sets in any order over successive stylus sync sub-frames. In one example, the drive logic 306 cycles through them repeatedly in the same sequence: ABCABCABC etc. In other examples, the sets are chosen randomly. In other examples, only some of the sets are used over a given period of time, with some being omitted.

In other examples, sets of sync-driven row electrodes are chosen selectively, rather than cycling through them in a predetermined order, to achieve a performance benefit. In some cases, the benefit is as described above, namely placing a particular synchronization waveform close to the stylus electrode, while ensuring that interfering waveforms are farther away. Accordingly, the drive logic 306 may select from a plurality of different sets of sync-driven row electrodes based on position information associated with an active stylus.

Position information used for set selection may be stored in various places, for example as position information 330 in drive logic 306 (FIG. 3). With regard to stylus 320, position information 330 can take a wide variety of forms, including (1) current, past or predicted row and column coordinates of the stylus; (2) speed of stylus movement over past touch-sensing frames; (3) direction of stylus movement over past touch-sensing frames; (4) indicators affecting the ability to predict future position of the stylus; etc. In general, position information can include any type of information that may be useful in determining where stylus electrode 322 will be in a future touch-sensing frame. Position information may be performed in any suitable manner, including via the non-limiting examples described above, in which row drive sub-frames (RDSFs) 404 and stylus drive sub-frames (SDSFs) 406 (FIG. 4) are used to establish row coordinates and column coordinates for stylus 320.

When predictive-quality exceeds a threshold (e.g., relatively high confidence in future position of stylus), drive logic may enter a mode where sync-driven row electrode sets are chosen based on the position information. Referring again to the example of FIG. 5, if the system is able to predict, with sufficient accuracy, that the stylus electrode will be very close to point 508 in an upcoming touch-sensing frame, then drive logic 306 may employ Set C of sync-driven row electrodes for synchronization.

The drive logic may switch into and out of position-based selection. For example, prior to selecting based on position, the drive logic may be operating in a cycling mode, in which a defined sequence of sets is used, or a random cycling is used. These less-selective approaches may be employed when the system is not able to sufficiently assess whether one set will outperform another, in terms of its ability to effectively position synchronization waveforms around the stylus electrode. For example, if the stylus electrode is moving quickly, beyond a velocity threshold, then the drive logic may revert to a cycling mode (e.g., an ABCABCAB-CABC . . . set selection from FIG. 5). In addition to or instead of velocity thresholds, any type of threshold associated with the position information may be used to mode switch into and out of selecting sets of sync-driven row electrodes based on position information 330.

In typical implementations, receive logic, whether in matrix 300 or stylus 320, includes specific circuitry tuned to account for the properties of the excitation signal it receives. In some examples, receive processing is performed via correlation operations using a reference signal, which typically is based off of, and in many cases identical to, the excitation waveform. For example, if a synchronization waveform on a sync-driven row electrode is a 50% duty cycle square wave, a phase-aligned 50% duty cycle square wave may be used in receive circuitry for correlation purposes (e.g., in receive logic 326 of stylus 320). A high positive value in the correlation receiver indicates affirmative presence of the excitation signal. In the inversion examples mentioned above (one synchronization waveform is the inversion of the other), it will often be possible to use a single receiver (i.e., one reference waveform). In more complicated examples, multiple different receivers may be employed, one for each different excitation waveform.

The present disclosure does contemplate examples where multiple different waveforms are used in a set of sync-driven row electrodes. For example, given a minimum expected size of a body contact patch occurring anywhere on matrix 300, a set of sync-driven row electrodes might be constructed so that four different synchronization waveforms are positioned underneath the contact patch. The waveforms would be designed so that they collectively at least partially cancel one another, thereby reducing current into the user's body and maintaining current into stylus electrode 322. Use of this many waveforms may provide various benefits, though at the expense of configuring and operating four receivers within receive logic 326 of stylus 320.

In some circumstances in the above example, all four receivers must operate simultaneously. This might occur, for example, if the stylus does not know its row coordinate on the matrix. Not knowing that, the stylus cannot know what the nearby synchronization waveforms will be, and thus must attempt detection on all four of the different synchronization waveforms. On the other hand, the stylus may know its position, but not have knowledge of where the different synchronization waveforms will be placed along the row electrodes 302 of the matrix.

Accordingly, in some examples, operation of receive logic 326 in stylus 320 may be controlled based on position information (e.g., stylus coordinates) and set information for the sync-driven row electrodes (i.e., what row electrodes 302 will be activated and what synchronization waveforms will be used). For example, via some type of communication from matrix 300 (e.g., radio or electrostatic), or through another method, stylus 320 may learn of the various sets of sync-driven row electrodes that are employed. More specifically, the stylus may know that a particular set will be used in a specific upcoming touch-sensing frame, and that in that set, the row electrode 302 closest to its current position will be activated with a particular synchronization waveform. This may then enable the receive logic 326 to run only a receiver (e.g., correlation operation) particular to that synchronization waveform, instead of a less-targeted approach where multiple receivers are active. In other words, selective activation and deactivation of receivers may be based upon knowledge of the different sets of sync-driven row electrodes and which of such sets will be deployed by the drive logic during an upcoming stylus sync sub-frames.

Figure 6:
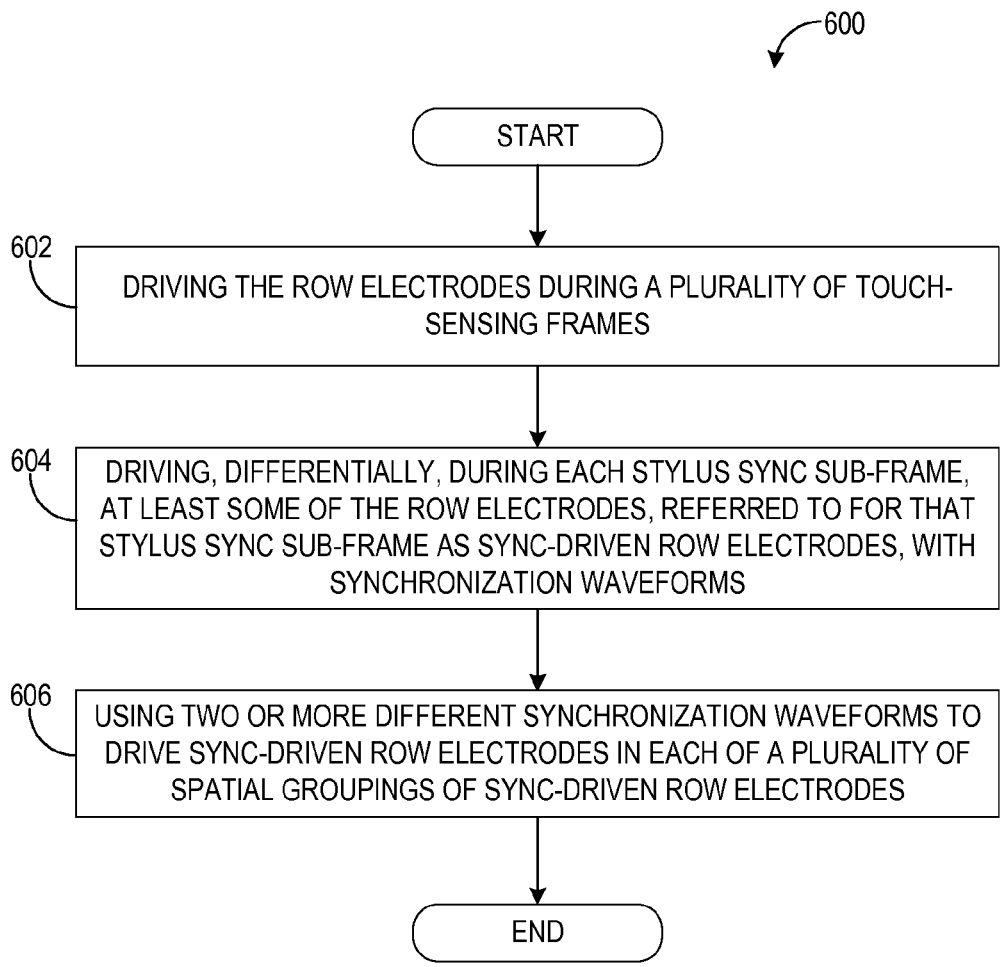
FIG. 6 shows an example touch-sensing method.

Referring now to FIG. 6, the figure depicts a touch-sensing method 600 for a display device having a touch sensor with a matrix of row electrodes and column electrodes. The method may be employed in connection with the systems shown in FIGS. 1-3, or with differently-configured systems. At 602, the method includes driving the row electrodes during a plurality of touch-sensing frames, e.g., in order to determine row/column coordinates of a user's finger and an active stylus. Each of the touch-sensing frames includes a stylus-sync sub-frame. At 604, the method includes driving, differentially, during each stylus sync sub-frame, at least some of the row electrodes, referred to for that stylus sync sub-frame as sync-driven row electrodes with synchronization waveforms. The synchronization waveforms are communicated electrostatically to an active stylus to synchronize the active stylus and the display device. The driving includes differentially driving the sync-driven row electrodes of the stylus sync sub-frame, such that a synchronization waveform used to drive one of the sync-driven row electrodes is different than a synchronization waveform used to drive another of the sync-driven row electrodes.

As shown at 606, the differential driving indicated at 604 may further include using two or more different synchronization waveforms to drive sync-driven row electrodes in each of a plurality of spatial groupings of sync-driven row electrodes. The two or more different synchronization waveforms may be configured to produce at least partially cancelling electrical conditions. This may reduce, in the event of a user's body part touching the display device on a contact patch over the spatial grouping of sync-driven row electrodes, current flowing into the user's body part, relative to current which would flow in the case of undifferentiated driving of the sync-driven row electrodes in the spatial grouping. In some examples, a spatial grouping may include synchronization waveforms of opposite polarity to provide cancellation, though this is but one example. Any size spatial groupings may be employed and, as described above, a wide range of different types and numbers of waveforms may be used to achieve cancelling electrical conditions. Such cancellation may, as described above, reduce current flowing into the user's body to avoid compromising current needed by the stylus for synchronization.

Method 600 may further include selecting from among a plurality of different sets of sync-driven row electrodes to use during stylus sync sub-frames. Typically, each set will omit some of the row electrodes of the matrix and will differ from the other sets (e.g., a row electrode is sync-driven for one set and not for another). In some cases, the sets may be constructed so that, for any given point on an operative portion of the matrix (i.e., a stylus contact point), using the different sets causes variation of distance between the closest sync-driven row electrode and the stylus contact point. Typically, one of the sets will cause a reduction in distance between the stylus contact point and a closest sync-driven row electrode, relative to another set of the sync-driven row electrodes. The sets may be constructed so that this is below a threshold distance to provide desired synchronization signal strength to the stylus. The method may also include selecting from among the different sets based on position information associated with the active stylus. In one example, a set is selected to place a sync-driven row electrode as close as possible to the current row coordinate of the stylus, to thereby improve the strength of the synchronization signal. A variety of other position-based selections may be employed, as described above with reference to FIGS. 3 and 5.

Figure 7:
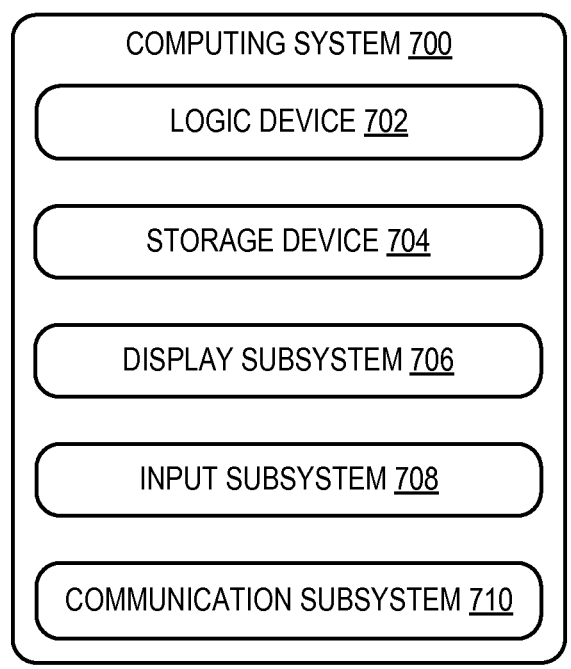
FIG. 7 shows a block diagram of an example computing device.

FIG. 7 schematically shows a non-limiting embodiment of a computing system 700, one or more aspects of which may be used to implement the touch-sensing systems and methods described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), wearable devices, and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 may include one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The logic machine may correspond to one or more of the various drive logic and receive logic described above. For example, logic and associated instructions may be implemented to select and apply waveforms to drive row electrodes to achieve synchronization; process inbound signals induced as a result of excitation of capacitively coupled electrodes; determine position of an active stylus; select from different sets of sync-driven row electrodes; etc.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

Storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

A "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In addition to the above description, the present disclosure contemplates, in a first example, a touch sensing system, which may include (1) a display device including a touch sensor having a matrix of row electrodes and column electrodes; and (2) drive logic coupled to the row electrodes and configured to drive the row electrodes during a plurality of touch-sensing frames, each of which includes a stylus sync sub-frame during which the drive logic drives at least some of the row electrodes, referred to for that stylus sync sub-frame as sync-driven row electrodes, with synchronization waveforms that are communicated electrostatically to cause synchronization of the display device with an active stylus. In each of the stylus sync sub-frames, the drive logic may be configured to differentially drive the sync-driven row electrodes of such stylus sync sub-frame, such that a first synchronization waveform used to drive one of the sync-driven row electrodes is different than a second synchronization waveform used to drive another of the sync-driven row electrodes.

In the first example, the drive logic may be configured to, for each stylus sync sub-frame, differentially drive sync-driven row electrodes during that sub-frame such that, for a plurality of spatial groupings of sync-driven row electrodes, two or more different synchronization waveforms are used to drive the sync-driven row electrodes in the spatial grouping, the two or more different synchronization waveforms being configured to produce at least partially cancelling electrical conditions to reduce, in the event of a user's body part touching the display device on a contact patch over the spatial grouping of sync-driven row electrodes, current flowing into the user's body part, relative to current which would flow in the case of undifferentiated driving of the sync-driven row electrodes in the spatial grouping. Further, the drive logic may be configured, for any given one of the stylus sync sub-frames, to select from among a plurality of sets of sync-driven row electrodes and differentially drive sync-driven row electrodes in that set of sync-driven row electrodes during the stylus sync sub-frame. Each set of sync-driven row electrodes omits some of the row electrodes of the matrix and differs from the other sets of sync-driven row electrodes. The sets of sync-driven row electrodes may be configured such that, for any given point on the matrix, cycling through the sets causes frame-to-frame variation in a distance between such point and a closest sync-driven row electrode. The drive logic may select from the plurality of sets of sync-driven row electrodes based on position information associated with an active stylus, and may switch into and out of position-based selection of the sets. In each of the sets of sync-driven row electrodes, every Nth row electrode may be a sync-driven row electrode.

In some cases, the system includes an active stylus having receive logic configured to selectively activate and deactivate multiple different receivers within the receive logic, where such selective activation/deactivation is based upon knowledge of the different sets of sync-driven row electrodes and which of such sets will be deployed by the drive logic during an upcoming stylus sync sub-frame.

In examples employing the above-recited spatial groupings, the drive logic may drive sync-driven row electrodes in each grouping using synchronization waveforms of opposite polarity. Also, the spatial groupings may be sized based on an expected minimum size of the above-recited contact patch.

The disclosure also contemplates an example touch-sensing method for a display device having a touch sensor with a matrix of row electrodes and column electrodes. The method includes: (1) driving the row electrodes during a plurality of touch-sensing frames, each of which includes a stylus sync sub-frame; and (2) during each stylus sync sub frame, driving at least some of the row electrodes, referred to for that stylus sync sub-frame as sync-driven row electrodes, with synchronization waveforms configured to be electrostatically communicated to an active stylus to synchronize the display device and the active stylus, where such driving during each stylus sync sub-frame includes differentially driving the sync-driven row electrodes of that stylus sync sub-frame, such that a first synchronization waveform used to drive one of the sync-driven row electrodes is different than a second synchronization waveform used to drive another of the sync-driven row electrodes.

The above example method may be implemented such that, for each stylus sync sub-frame, differentially driving the sync-driven row electrodes in that stylus sync sub-frame includes, for each of a plurality of spatial groupings of sync-driven row electrodes in that stylus sync sub frame, using two or more different synchronization waveforms to drive the sync-driven row electrodes in the spatial grouping, the two or more different synchronization waveforms being configured to produce at least partially cancelling electrical conditions to reduce, in the event of a user's body part touching the display device on a contact patch over the spatial grouping of sync-driven row electrodes, current flowing into the user's body part, relative to current which would flow in the case of undifferentiated driving of the sync-driven row electrodes in the spatial grouping. Synchronization waveforms of opposite polarity may be used on sync-driven row electrodes within each of the spatial groupings.

Differential driving of the sync-driven row electrodes during each of the stylus sync sub-frame may include, for any given stylus sync sub-frame, selecting from among a plurality of sets of sync-driven row electrodes and differentially driving the sync-driven row electrodes in that set during the stylus sync sub-frame, where each set of sync-driven row electrodes omits some of the row electrodes of the matrix and differs from the other sets of sync-driven row electrodes. The sets of different row electrodes may be configured such that, for any given point on the matrix, cycling through the sets causes frame-to-frame variation in a distance between such point and a closest sync-driven row electrode. Selection from the plurality of different sets may be made based on position information associated with an active stylus.

In another touch-sensing system example, the system includes: (1) a display device including a touch sensor having a matrix of row electrodes and column electrodes; and (2) drive logic coupled to the row electrodes. The drive logic is configured to drive the row electrodes during a plurality of touch-sensing frames, each of which includes a stylus sync sub-frame during which the drive logic drives at least some of the row electrodes, referred to for that stylus sync sub-frame as sync-driven row electrodes, with synchronization waveforms to facilitate synchronization of the display device with an active stylus. The drive logic is configured, for any given one of the stylus sync sub-frames, to select from among a plurality of sets of sync-driven row electrodes and differentially drive sync-driven row electrodes in that set of sync-driven row electrodes during the stylus sync sub-frame. The sets of sync-driven row electrodes differ from one another in terms of which of the row electrodes are sync-driven row electrodes. For each of the sets of sync-driven row electrodes, the differential driving includes, for each a plurality of spatial groupings of sync-driven row electrodes in the set, using two or more different synchronization waveforms in the spatial grouping which are configured to produce at least partially cancelling electrical conditions to reduce, in the event of a user's body part touching the display device on a contact patch over the spatial grouping, current flowing into the user's body part, relative to current which would flow in the case of undifferentiated driving of the sync-driven row electrodes in the spatial grouping In the above example, within each spatial grouping, the drive logic may drive sync-driven row electrodes using synchronization waveforms of opposite polarity, and may select from the plurality of sets of sync-driven row electrodes based on position information associated with an active stylus. Further, the sets of sync-driven row electrodes may be configured such that, for any given point on the matrix, cycling through the sets causes frame-to-frame variation in a distance between such point and a closest sync-driven row electrode.

The configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A touch sensing system, comprising:
a display device including a touch sensor having a matrix of row electrodes and column electrodes;
drive logic coupled to the row electrodes and configured to drive the row electrodes during a plurality of touch-sensing frames, each of which includes a stylus sync sub-frame during which the drive logic drives at least some of the row electrodes, referred to for that stylus sync sub-frame as sync-driven row electrodes, with synchronization waveforms that are communicated electrostatically to cause synchronization of the display device with an active stylus; and
where for each of the stylus sync sub-frames, the drive logic is configured to differentially drive the sync-driven row electrodes of such stylus sync sub-frame, such that a first synchronization waveform used to drive one of the sync-driven row electrodes is different than a second synchronization waveform used to drive another of the sync-driven row electrodes.

2. The touch-sensing system of claim 1, where the drive logic is configured to, for each stylus sync sub-frame, differentially drive sync-driven row electrodes during that sub-frame such that, for a plurality of spatial groupings of sync-driven row electrodes, two or more different synchronization waveforms are used to drive the sync-driven row electrodes in the spatial grouping, the two or more different synchronization waveforms being configured to produce at least partially cancelling electrical conditions to reduce, in the event of a user's body part touching the display device on a contact patch over the spatial grouping of sync-driven row electrodes, current flowing into the user's body part, relative to current which would flow in the case of undifferentiated driving of the sync-driven row electrodes in the spatial grouping.

3. The touch-sensing system of claim 2, where:
the drive logic is configured, for any given one of the stylus sync sub-frames, to select from among a plurality of sets of sync-driven row electrodes and differentially drive sync-driven row electrodes in that set of sync-driven row electrodes during the stylus sync sub-frame; and
each set of sync-driven row electrodes omits some of the row electrodes of the matrix and differs from the other sets of sync-driven row electrodes.

4. The touch-sensing system of claim 3, where the sets of sync-driven row electrodes are configured such that, for any given point on the matrix, cycling through the sets causes frame-to-frame variation in a distance between such point and a closest sync-driven row electrode.

5. The touch-sensing system of claim 3, where the drive logic selects from the plurality of sets of sync-driven row electrodes based on position information associated with an active stylus.

6. The touch-sensing system of claim 5, where the drive logic switches into and out of position-based selection of the sets of sync-driven row electrodes.

7. The touch-sensing system of claim 3, where in each of the sets of sync-driven row electrodes, each sync-driven row electrode of the set is separated by a number of non-sync-driven row electrodes.

8. The touch-sensing system of claim 3, further comprising an active stylus having receive logic configured to selectively activate and deactivate multiple different receivers within the receive logic, where such selective activation/deactivation is based upon knowledge of the different sets of sync-driven row electrodes and which of such sets will be deployed by the drive logic during an upcoming stylus sync sub-frame.

9. The touch-sensing system of claim 2, where within each spatial grouping, the drive logic drives sync-driven row electrodes using synchronization waveforms of opposite polarity.

10. The touch-sensing system of claim 2, where the spatial groupings are sized based on an expected minimum size of the contact patch.

11. A touch-sensing method for a display device having a touch sensor with a matrix of row electrodes and column electrodes, comprising:
driving the row electrodes during a plurality of touch-sensing frames, each of which includes a stylus sync sub-frame; and
during each stylus sync sub-frame, driving at least some of the row electrodes, referred to for that stylus sync sub-frame as sync-driven row electrodes, with synchronization waveforms configured to be electrostatically communicated to an active stylus to synchronize the display device and the active stylus, where such driving during each stylus sync sub-frame includes differentially driving the sync-driven row electrodes of that stylus sync sub-frame, such that a first synchronization waveform used to drive one of the sync-driven row electrodes is different than a second synchronization waveform used to drive another of the sync-driven row electrodes.

12. The touch-sensing method of claim 11, where for each stylus sync sub-frame, differentially driving the sync-driven row electrodes in that stylus sync sub-frame includes, for each of a plurality of spatial groupings of sync-driven row electrodes in that stylus sync sub-frame, using two or more different synchronization waveforms to drive the sync-driven row electrodes in the spatial grouping, the two or more different synchronization waveforms being configured to produce at least partially cancelling electrical conditions to reduce, in the event of a user's body part touching the display device on a contact patch over the spatial grouping of sync-driven row electrodes, current flowing into the user's body part, relative to current which would flow in the case of undifferentiated driving of the sync-driven row electrodes in the spatial grouping.

13. The touch-sensing method of claim 12, where synchronization waveforms of opposite polarity are used on sync-driven row electrodes within each of the spatial groupings.

14. The touch-sensing method of claim 12, where the differential driving of the sync-driven row electrodes during each of the stylus sync sub-frame includes, for any given stylus sync sub-frame, selecting from among a plurality of sets of sync-driven row electrodes and differentially driving the sync-driven row electrodes in that set during the stylus sync sub-frame, where each set of sync-driven row electrodes omits some of the row electrodes of the matrix and differs from the other sets of sync-driven row electrodes.

15. The touch-sensing method of claim 14, where the sets of sync-driven row electrodes are configured such that, for any given point on the matrix, cycling through the sets causes frame-to-frame variation in a distance between such point and a closest sync-driven row electrode.

16. The touch-sensing method of claim 14, where selecting from among the plurality of sets includes making such selection based on position information associated with an active stylus.

17. A touch-sensing system, comprising:
a display device including a touch sensor having a matrix of row electrodes and column electrodes;
drive logic coupled to the row electrodes;
where the drive logic is configured to drive the row electrodes during a plurality of touch-sensing frames, each of which includes a stylus sync sub-frame during which the drive logic drives at least some of the row electrodes, referred to for that stylus sync sub-frame as sync-driven row electrodes, with synchronization waveforms to facilitate synchronization of the display device with an active stylus;
where the drive logic is configured, for any given one of the stylus sync sub-frames, to select from among a plurality of sets of sync-driven row electrodes and differentially drive sync-driven row electrodes in that set of sync-driven row electrodes during the stylus sync sub-frame;
where the sets of sync-driven row electrodes differ from one another in terms of which of the row electrodes are sync-driven row electrodes; and
where for each of the sets of sync-driven row electrodes, the differential driving includes, for each a plurality of spatial groupings of sync-driven row electrodes in the set, using two or more different synchronization waveforms in the spatial grouping which are configured to produce at least partially cancelling electrical conditions to reduce, in the event of a user's body part touching the display device on a contact patch over the spatial grouping, current flowing into the user's body part, relative to current which would flow in the case of undifferentiated driving of the sync-driven row electrodes in the spatial grouping.

18. The touch-sensing system of claim 17, where within each spatial grouping, the drive logic drives sync-driven row electrodes using synchronization waveforms of opposite polarity.

19. The touch-sensing system of claim 17, where the drive logic selects from the plurality of sets of sync-driven row electrodes based on position information associated with an active stylus.

20. The touch-sensing system of claim 17, where the sets of sync-driven row electrodes are configured such that, for any given point on the matrix, cycling through the sets causes frame-to-frame variation in a distance between such point and a closest sync-driven row electrode.

* * * * *